United States Patent
Wu et al.

(10) Patent No.: US 6,591,031 B2
(45) Date of Patent: Jul. 8, 2003

(54) OPTICAL SWITCH WITH MOVABLE MIRROR

(75) Inventors: Kun-Tsan Wu, Tu-Chen (TW); Chih-Yuan Liao, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/036,284

(22) Filed: Dec. 24, 2001

(65) Prior Publication Data

US 2003/0048982 A1 Mar. 13, 2003

(30) Foreign Application Priority Data

Sep. 12, 2001 (TW) ........................................ 90122663 A

(51) Int. Cl.[7] ................................................ G02B 6/42
(52) U.S. Cl. .............................. 385/18; 385/33; 385/24; 385/16
(58) Field of Search ............................... 385/16–24, 33, 385/31, 32, 37, 10

(56) References Cited

U.S. PATENT DOCUMENTS 6,427,038 B1 * 7/2002 Britz et al. .................... 385/18

\* cited by examiner

Primary Examiner—Phan T. H. Palmer
(74) Attorney, Agent, or Firm—WeiTe Chung

(57) ABSTRACT

An optical switch (1) includes a cover (10), a base (20), two input ports (30,50), two output ports (40,60), a movable reflecting element (70), a fixed reflecting element (80), and a driving means (90). The movable reflecting element has a first mirror (71) and an opposite facing second mirror (72). The fixed reflecting element has a third mirror (81). The movable reflecting element is movable by the driving means from a first position, in which signals transmit from input to output ports without reflection from mirrors, to a second position, in which reflection from the mirrors effects a switching of the optical signals to different output ports. The presence of the fixed reflecting element automatically compensates for a distance between the first and second mirrors, allowing reflected signals to accurately align with respective output ports.

28 Claims, 3 Drawing Sheets

OPTICAL SWITCH WITH MOVABLE MIRROR

BACKGROUND OF THE INVENTION

1. Field of the Invention

The present invention relates to an optical switch for use in optical fiber communication and optical network technology, and particularly to an optical switch having a movable mirror to control the path of a light beam.

2. Description of Related Art

Optical signals are commonly transmitted in optical fibers, which provide efficient light channels through which the optical signals can pass. Recently, optical fibers have been used in various fields, including telecommunications, where light passing through an optical fiber is used to convey either digital or analog information. Efficient switching of optical signals between individual fibers is necessary in most optical processing systems or networks to achieve the desired routing of the signals.

A typical switch has one or more light input port(s) and at least two light output ports for performing switching or logical operations to optical signals in a light transmitting line/system or in an integrated optical circuit. Factors for assessing the capability of an optical switch include low insertion loss (IL<1 db), good isolation performance (>50 db), and fast switching speed (normally, tens of milliseconds).

Optical switches are divided into two types: a mechanical type and a non-mechanical type. In principle, the mechanical-type optical switches have a number of advantages over other forms of optical switches in applications where switching speed is not important. Mechanical-type optical switches offer lower insertion losses, low cross-talk, and insensitivity to wavelength of light.

Conventional mechanical-type optical switches come in two different designs: where the optical components move, and where the fibers move. Moving fiber switches involve the actual physical movement of one or more of the fibers to specific positions to accomplish the transmission of a beam of light from one fiber end to another under selected switching conditions. Moving optical component switches, on the other hand, include optical collimating lenses, which expand the beam of light from the fibers, and then, using moving prisms or mirrors, reswitch the expanded beam as required by the switching process.

The moving fiber switches have a stringent tolerance requirement for the amount and direction of fiber movement. The tolerance is typically a small portion of the fiber core diameter for two fibers to precisely collimate to reduce loss. The fibers themselves are quite thin and may be subject to breakage if not properly protected. On the other hand, reinforcing the fibers with stiff protective sheaths makes the fibers less flexible, increasing the force required to manipulate each fiber into alignment. Thus these moving fiber optical switches share a common problem of requiring high precision parts to obtain precise positioning control and low insertion loss. This results in high costs and complicates manufacture of the switches. Moreover, frequently moving fibers to and fro is apt to damage or even break the fibers. The switching speed of these moving fiber optical switches is also slow.

Conventional moving optical component switches have less stringent movement control tolerance requirements because of the collimating lenses.

One prior art moving optical component switch is illustrated in FIGS. 4, 5 and 6 and comprises a first and second light input ports 130, 150, a first and second light output ports 140, 160, and a movable reflecting element 170. The movable reflecting element 170 has two reflecting surfaces 171, 172, which are parallel to each other. The first reflecting surface 171 is movably arranged to reflect light from the first light input port 130 to the second light output port 160, and the second reflecting surface 172 is movably arranged to reflect light from the second light input port 150 to the first light output port 140.

The optical switch switches the light signals by moving the movable reflecting element 170 between two positions. In the first position, the movable reflecting element 170 is out of the path of the light beams and optical signals from the first input port 130 are transmitted to the first output port 140, while optical signals from the second input port 150 are transmitted to the second output port 160.

In the second position, the movable reflecting element 170 moves into the path of the light beams and the optical signals from the first input port 130 are reflected by the first reflecting surface 171 to the second output port 160, while the optical signals from the second input port 150 are reflected by the second reflecting surface 172 to the first output port 140.

If the first reflecting surface 171 and the second reflecting surface 172 were on the same plane, the optical switch would achieve low loss and precise collimation. However, the prior art device has the two reflecting surfaces or reflective films deposited on two opposite surfaces of a substrate having some thickness, so it is impossible for the first reflecting surface and the second reflecting surface to be on the same plane. Thus, as illustrated in FIG. 6, when the movable reflector moves into the path of the light beams, the optical signals from the second input port 150 and reflected from the second reflecting surface 172 may not exactly align with the first output port 140, as should the optical signals from the first input port 130 to the second output port 160. Consequently, a solution to the misalignment of the second light beam in this kind of optical switch is desired.

SUMMARY OF THE INVENTION

An object of the present invention is to eliminate the influence of a distance between two opposite reflecting surfaces of a movable two-sided reflecting element when such reflecting element is used to switch signals coming from a first and second input ports between first and second output ports in an optical switch.

An optical switch in accordance with one embodiment of the present invention comprises two input ports, two output ports and a switching element. The switching element includes a movable reflecting element and a fixed reflecting element. The movable reflecting element is a two-sided mirror and can move between a first position and a second position. The fixed reflecting element has at least one mirror, which is mounted parallel to the two-sided mirror. The first input port is aligned with the first output port, and the second input port is aligned with the second output port. When the movable reflecting element is out of the path of the light beams, the fixed reflecting element does not affect the path of the optical signals, and the optical signals from the first and second input ports are transmitted to the first and second output ports, respectively. When the movable reflecting element is moved into the path of the light beams, the fixed reflecting element functions to reflect the optical signals coming from the second input port so that they are reflected twice off the two-sided mirror, automatically accommodating the distance between the two reflecting surfaces of the moveable reflecting element and correctly aligning the reflected optical signals with the first output port. An efficient switching operation is thus achieved.

Other objects, advantages and novel features of the invention will become more apparent from the following detailed description when taken in conjunction with the accompanying drawings.

DETAILED DESCRIPTION OF THE INVENTION

Figure 1:
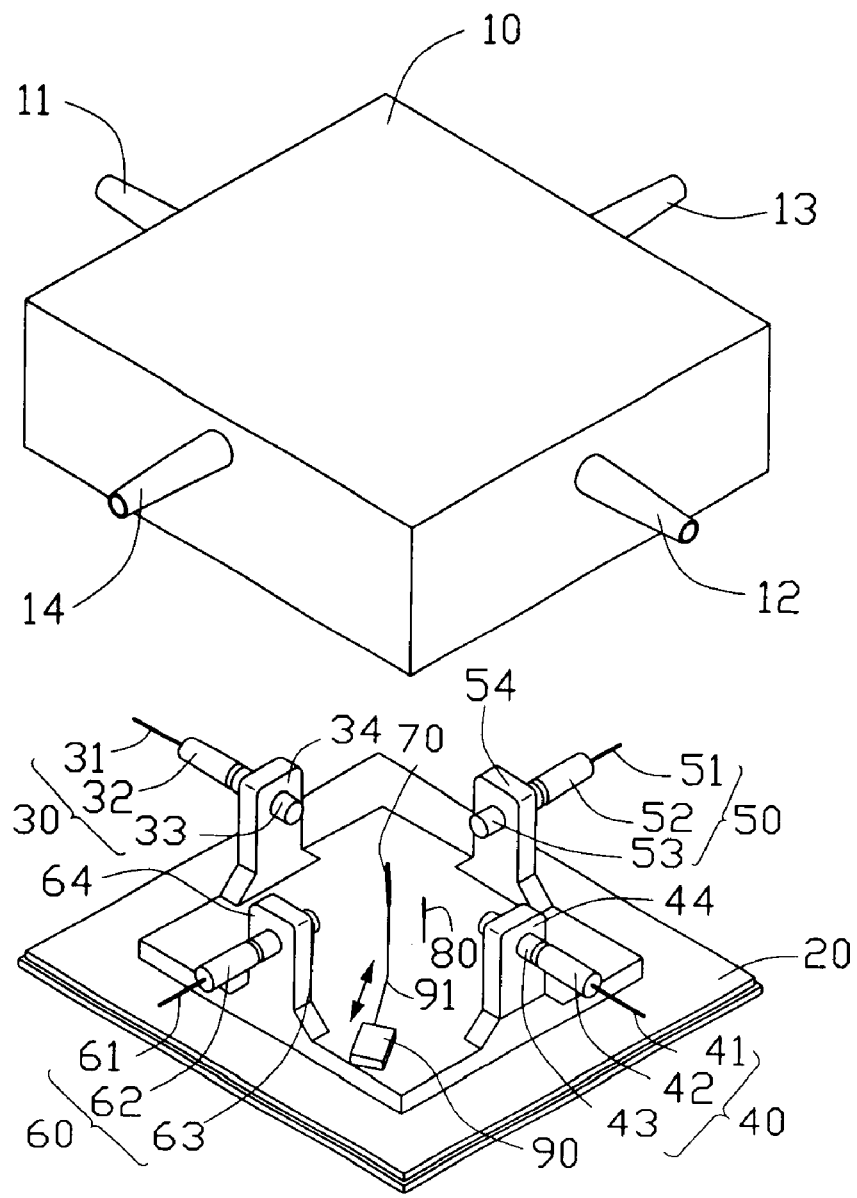
FIG. 1 is a perspective view of an optical switch having a movable reflecting element in accordance with the present invention.
Figure 2:
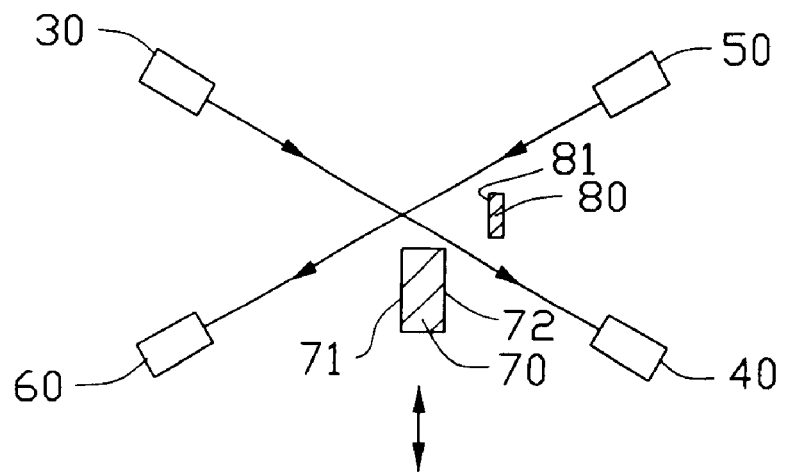
FIG. 2 is an essential optical paths diagram of the optical switch of FIG. 1 with the movable reflecting element in a first position.
Figure 3:
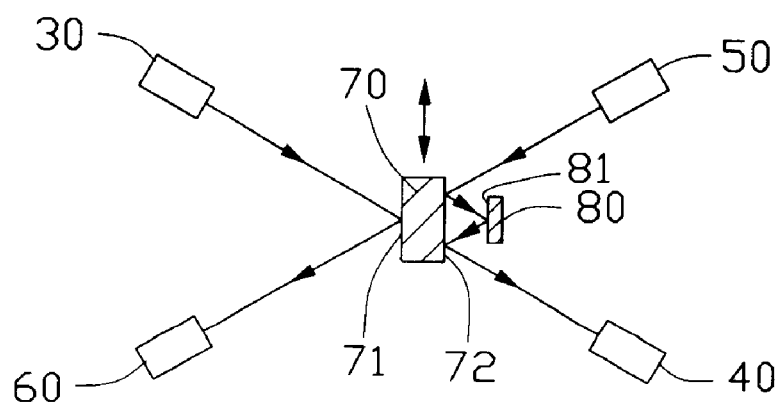
FIG. 3 is similar to FIG. 2, but with the movable reflecting element in a second position.
Figure 4:
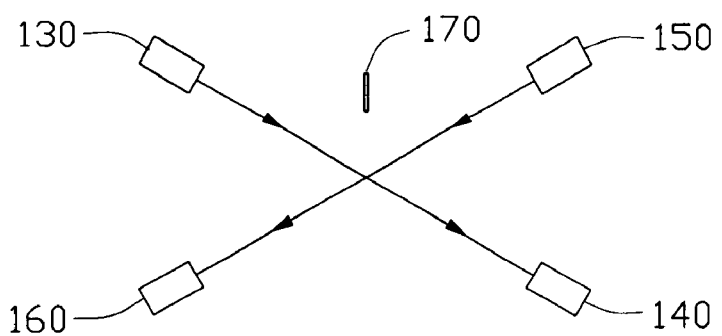
FIG. 4 is an essential optical paths diagram of a conventional optical switch with a movable reflective element in a first position.
Figure 5:
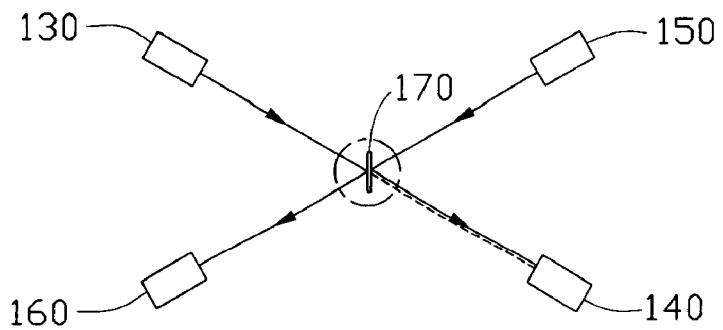
FIG. 5 is an essential optical paths diagram of the switch of FIG. 4 with the movable reflective element in a second position.
Figure 6:
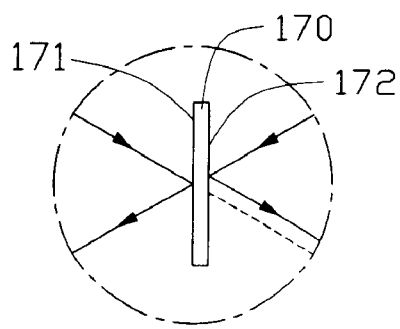
FIG. 6 is a partial, enlarged view of FIG. 5 with the movable reflective element in a second position.

As shown in FIGS. 1–3, an optical switch 1 with a movable reflector in accordance with the present invention comprises a cover 10 and a base 20, with the base 20 mounting a first input port 30, a first output port 40, a second input port 50, a second output port 60, a movable reflecting element 70, a fixed reflecting element 80, and a driving means 90.

The first input port 30, the first output port 40, the second input port 50 and the second output port 60 are all similar to each other. The first input port 30 comprises a first input fiber 31, a first input ferrule 32 and a first input optical collimating lens, which in the present embodiment is a quarter pitch first input GRIN lens 33. The first input fiber 31 is received and retained in the first input ferrule 32, and an end face (not labeled) of the first input ferrule 32 is fixed in close proximity to a corresponding face (not labeled) of the quarter pitch first input GRIN lens 33. The arrangement of a first output fiber 41, a first output ferrule 42, and a quarter pitch first output GRIN lens 43 in the first output port 40 is the same as for the first input port 30, as is the arrangement of a second input fiber 51, a second input ferrule 52, and a quarter pitch second input GRIN lens 53 in the second input port 50, and as is a second output fiber 61, a second output ferrule 62, and a quarter pitch second output GRIN lens 63 in the second output port 60. The first input GRIN lens 33 and the second input GRIN lens 53 are each used to collimate a light beam which is selectively directed to either the first output GRIN lens 43 or the second output GRIN lens 63.

The movable reflecting element 70 includes a first mirror 71 and a second mirror 72 parallel to and directed opposite one another. The movable reflecting element 70 moves to and fro between a first position and a second position. The first mirror 71 is oriented to reflect signals coming from the first input port 30, and the second mirror 72 is oriented to reflect signals coming from the second input port 50, when the movable reflecting element 70 is in the second position.

The fixed reflecting element 80 includes a third mirror 81 which confronts and is parallel to the second mirror 72 when the movable reflecting element 70 is in the second position. The first mirror 71, the second mirror 72 and the third mirror 81 are small enough that, when the movable reflecting element 70 is not in the second position, they have no influence on the light beams.

The driving means 90 is realized by a motor or a relay, and comprises a movable arm 91. The movable arm 91 is attached to the movable reflecting element 70 and actuates it to move to and fro between the first and second positions.

The cover 10 and the base 20 define an interior space (not labeled) therebetween for accommodating the first input/output ports 30,40, the second input/output ports 50,60, the movable reflecting element 70, the fixed reflecting element 80 and the driving means 90 therein. The cover 10 has four lead sections 11,12,13,14 for protecting the corresponding fibers 31,41,51,61 of the ports 30,40,50,60. The base 20 further includes four holders 34,44,54,64 for mounting the ports 30,40, 50,60, respectively, on the base 20. Moreover, the fixed reflecting element 80 is also attached to the base 20.

FIG. 2 shows the essential optical paths diagram of the optical switch 1 with the movable reflecting element 70 in the first position, out of the path of the light beams, before the driving means 90 moves the movable reflecting element 70. The fixed reflecting element 80 is also out of the path of the light beams in this first position. Optical signals from the first input fiber 31 are collimated by the first input GRIN lens 33 and are transmitted as parallel light beams to the first output GRIN lens 43, which collimates the parallel light beams and transmits them to the first output fiber 41 of the first output port 40. At the same time, optical signals from the second input fiber 51 are collimated by the second input GRIN lens 53 and are transmitted as parallel light beams to the second output GRIN lens 63, which collimates the parallel light beams and transmits them to the second output fiber 61 of the second output port 60.

FIG. 3 shows the essential optical paths diagram of the optical switch 1 after the driving means 90 and movable arm 91 have moved the movable reflecting element 70 to the second position, into the path of the light beams. In this second position, optical signals from the first input fiber 31 of the first input port 30 are collimated by the first input GRIN lens 33 and are transmitted as parallel light beams to the first mirror 71 of the movable reflecting element 70, which reflects the parallel light beams to the second output GRIN lens 63. After being collimated by the second output GRIN lens 63, the signals are received by the second output fiber 61 of the second output port 60. The optical signals from the second input fiber 51 are collimated by the second input GRIN lens 53 and are transmitted as parallel light beams to the second mirror 72 of the movable reflecting element 70, whereupon they are reflected to the third mirror 81 of the fixed reflecting element 80, which reflects the light beams to the second mirror 72 again, which reflects the light beams to the first output GRIN lens 43. After being collimated by the first output GRIN lens 43, the signals are received by the first output fiber 41 of the first output port 40.

By controlling the position of the movable reflecting element 70 using the driving means 90, the path of the light beams through the optical switch 1 is controlled, and the light beams emitted from the input ports 30,50 can be selectively switched between the output ports 40,60. Transmission of the optical signals through the optical switch 1 is efficient, having a low insertion loss and good isolation performance, since the arrangement of the mirrors 71,72,81 automatically compensates for the distance between the first mirror 71 and the second mirror 72. Thus optical signals from the second input port 50 which are reflected from the second mirror 72 and the first mirror 81 are aligned with the first output port 40, yielding good transmission performance. Note that if a first distance between the first mirror 71 and the second mirror 72, and a second distance between the second mirror 72 and the third mirror 81, are chosen correctly, then the distance that a first set of optical signals travels from the second input port 50 to the first output port 40 will be substantially the same as the distance that a second set of optical signals travels from the first input port 30 to the second output port 60. Thus there should be no phase shift between the signals arriving at the second output port 60 and those arriving at the first output port 40. With very high speed communications, this can provide an added advantage.

Manufacture of the optical switch of the present invention can be accomplished using the process described in the following steps:

1) arranging the movable reflecting element 70 in the path of the light beams and then adjusting and fixing the positions and orientations of the first input port 30 and the second output port 60 so that the optical signals from the first input port 30 propagate to the second output port 60 after being reflected by the first mirror 71 of the movable reflecting element 70;
2) moving the movable reflecting element 70 out of the path of the light beams and adjusting the positions and orientations of the first output port 40 and the second input port 50 so that the optical signals from the first input port 30 accurately transmit to the first output port 40, and the optical signals from the second input port 50 accurately transmit to the second output port 60.
3) moving the movable reflecting element 70 into the path of the light beams again in the prior position and adjusting the position and orientation of the fixed reflecting element 80 so that the optical signals from the second input port 50 propagating to the first output port 40 are reflected three times (two times by the second mirror 72 of the movable reflecting element 70 and one time by the third mirror 81 of the fixed reflecting element 80).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the fixed reflecting element 80 may be movable, and further, the fixed reflecting element 80 may be movable in tandem together with the movable reflecting element 70 so that both the reflecting elements 70, 80 move into and out of the path of the light beams at the same time.

What is claimed is:

1. An optical switch with movable reflector for switching selectively optical signals from an input port to an output port, comprising:
    at least one input port,
    at least one output port,
    a switching means comprising a first mirror, a second mirror and a third mirror;
    whereby the optical signals from the input port are reflected two times by the second mirror and one time by the third mirror, and then enter the output port.
2. The optical switch with movable reflector as claimed in claim 1, wherein the at least one input port comprises a first input port and a second input port, and the at least one output port comprises a first output port and a second output port.
3. The optical switch with movable reflector as claimed in claim 2, wherein the first input port is opposite to the first output port, and the second input port is opposite to the second output port.
4. The optical switch with movable reflector as claimed in claim 2, wherein a cross point of a light beam from the first input port and a light beam from the second input port coincides with allocation of at the first mirror, and the optical signals from the first input port are reflected by the first mirror and propagate to the second output port.
5. The optical switch with movable reflector as claimed in claim 2, wherein the optical signals from the second input port are reflected two times by the second mirror and one time by the third mirror and propagate to the first output port.
6. The optical switch with movable reflector as claimed in claim 1, wherein the switching means comprises a movable reflecting element and a fixed reflecting element.
7. The optical switch with movable reflector as claimed in claim 6, wherein the first mirror and the second mirror are attached to opposite sides of the movable reflecting element.
8. The optical switch with movable reflector as claimed in claim 7, wherein the third mirror is attached to the fixed reflecting element and opposite to the second mirror.
9. The optical switch with movable reflector as claimed in claim 1, wherein the first mirror, the second mirror and the third mirror are parallel to each other.
10. A optical switch with movable reflector comprising:
    a first input port;
    a first output port;
    a second input port;
    a second output port;
    a movable reflecting element comprising a first mirror and a second mirror, which moves to and fro between a first and a second positions; and
    a fixed reflecting element comprising a third mirror,
    wherein, in the first position, first optical signals propagate from the first input port to the first output port and second optical signals propagate from the second input port to the second output port and neither the first nor the second optical signals are reflected by the movable reflecting element, and in the second position, first optical signals propagate from the first input port to the second output port after being reflected by the first mirror, and second optical signals propagate from the second input port to the first output port after being reflected two times by the second mirror and one time by the third mirror.
11. The optical switch with movable reflector as claimed in claim 10, further comprising a driving means.
12. The optical switch with movable reflector as claimed in claim 11, further comprising a base and a cover.
13. The optical switch with movable reflector as claimed in claim 12, wherein the base and the cover define an interior space therebetween for accommodating and mounting the first input/output ports, the second input/output ports, the movable reflecting element, the fixed reflecting element and the driving means therein.
14. The optical switch with movable reflector as claimed in claim 11, wherein the driving means is a motor or a relay.

15. The optical switch with movable reflector as claimed in claim 11, wherein the driving means has a movable arm attached to the movable reflecting element.

16. The optical switch with movable reflector as claimed in claim 10, wherein the first, second and third mirror are parallel to each other.

17. The optical switch with movable reflector as claimed in claim 16, wherein a distance between the first mirror and the second mirror is equal to a distance between the second mirror and the third mirror, thereby eliminating a phase shift between signals arriving at the first output port and signals arriving at the second output port when the movable reflecting element is in the second position.

18. The optical switch with movable reflector as claimed in claim 10, wherein each port comprises an optical collimating lens.

19. The optical switch with movable reflector as claimed in claim 18, wherein the optical collimating lens is a GRIN lens.

20. The optical switch with movable reflector as claimed in claim 10, wherein the first input port is opposite to the first output port, and the second input port is opposite to the second output port.

21. The optical switch with movable reflector as claimed in claim 10, wherein, in the second position, the first mirror is in a line of transmission from the first input port, and the second mirror is in a line of transmission from the second input port.

22. The optical switch with movable reflector as claimed in claim 10, wherein each port further comprises a fiber and a ferrule.

23. An optic switch comprising:
   opposite first and second optic input ports and opposite first and second output ports;
   said first optic input port cooperating with said first optic output port to define a first unreflective signal path;
   said second optic input port cooperating with said second optic output port to define a second unreflective signal path;
   said first optic input port cooperating with said second optic output port to define a first reflective signal path;
   said second optic input port cooperating with said first optic output port to define a second reflective signal path;
   an intersection point defined by said first unreflective signal path and said second unreflective signal path; and
   a moveable reflective device positionable around said intersection point resulting in said first and second reflective signal paths under a condition that the second reflective signal path hits said reflective device once while the first reflective signal path hits said reflective device twice.

24. A method of manufacturing an optical switch comprises the following steps:
   providing two input ports comprising a first input port and a second input port for transmitting optical signals into the optical switch;
   providing two output ports comprising a first output port and a second output port for receiving the optical signals from the optical switch;
   providing a movable reflecting element comprising two mirrors which movable between a first position and a second position to shift the path of the optical signals;
   providing a fixed reflecting element comprising at least a mirror;
   moving the movable reflecting element into the path of the optical signals;
   transmitting the optical signals from the first input port and adjusting the positions of the first input port and the second output port so that the optical signals from the first input port are reflected by the movable reflecting element and are received by the second output port;
   moving the movable reflecting element out of the path of the optical signals;
   transmitting the optical signals from the first input port and the second input port, and adjusting the positions of the first output port and the second input port to align with the first input port and the second output port, respectively;
   moving the movable reflecting element into the path of the optical signals and adjusting the position of the fixed reflecting element so that optical signals transmitted from the second input port are received by the first output port.

25. The method of manufacturing an optical switch as claimed in claim 24, wherein the optical signals from the first input port are reflected by a first mirror of the movable reflecting element and are received by the second output port, when the movable reflecting element blocks the path of the optical signals.

26. The method of manufacturing an optical switch as claimed in claim 25, wherein, the optical signals from the second input port are reflected two times by a second mirror of the movable reflecting element and one time by a third mirror of the fixed reflecting element and are received by the first input port when the movable reflecting element blocks the path of the optical signals.

27. The method of manufacturing an optical switch as claimed in claim 26, wherein the first mirror, the second mirror and the third mirror are small enough that, when they are not in the path of the optical signals, they have no influence on the optical signals.

28. The method of manufacturing an optical switch as claimed in claim 24, wherein every port comprises at least an optical collimating lens.

* * * * *